United States Patent [19]

Delavie

[11] 3,869,571

[45] Mar. 4, 1975

[54] DEVICE FOR THE USE OF A FACSIMILE APPARATUS AS A PRINTING MECHANISM

[75] Inventor: Jean-Henri Delavie, Paris, France

[73] Assignee: Compagnie Industrille Des Telecommunications Cit-Alcatel, Paris, France

[22] Filed: June 1, 1973

[21] Appl. No.: 366,143

[30] Foreign Application Priority Data

June 1, 1972 France .............................. 72.19743

[52] U.S. Cl. .............................. 178/30, 340/324 AD

[51] Int. Cl. .............................. G06f 3/14, H041 15/34

[58] Field of Search .................... 178/30, 23 R, 17.5; 340/324 AD

[56] References Cited

UNITED STATES PATENTS 3,622,701 11/1971 Gardner .............................. 178/30

3,740,743 6/1973 Baron .............................. 178/30

*Primary Examiner*—Thomas A. Robinson

*Attorney, Agent, or Firm*—Craig & Antonelli

[57] ABSTRACT

Device for the use of a facsimile apparatus as a printing mechanism, comprising a logic instrument with circulating memories which, when placed between the end of a telegraphic line or a generator of data and a facsimile apparatus, assures the printing of the alphanumeric characters by means of the facsimile apparatus in the form of a matrix of points grouped in lines and columns, furnished by a character generator.

13 Claims, 5 Drawing Figures

DEVICE FOR THE USE OF A FACSIMILE APPARATUS AS A PRINTING MECHANISM

Figure 1:
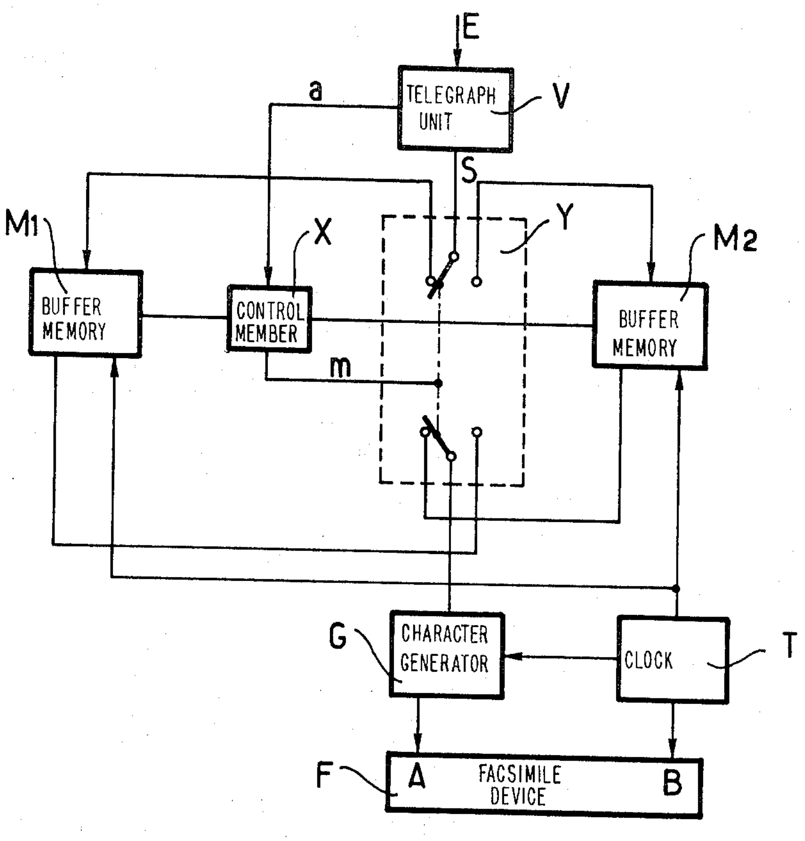

The present invention pertains to the field of data transmission. It is concerned with a logic instrument which, when placed between the end of a telegraphic line or of a data generator and a facsimile apparatus, assures the impression or printing of the alphanumeric characters by means of the facsimile apparatus in the form of a matrix of points grouped into lines and columns. The industrial application resides in the use of a facsimile apparatus for receiving telegraphic messages in the place of a print unit or printing mechanism, and the facsimile apparatus may thus be used for two purposes, either for receiving images in stroke form, or for printing messages.

The present invention is based on the use of a character generator. A character generator is a known apparatus, used for example for visualization, which may be defined as a logicalspatial transcoder furnishing, in response to a code of n bits applied in parallel at the input thereof, a matrix of points disposed in p columns and q lines, which represents, with a good approximation, an alphanumeric character corresponding to each code received.

The facsimile apparatus furnishes a scanning in a continuous line, for example by means of a helical mirror in the case of the sweeping or scanning by a beam of light on photo-sensitive paper, or by means of a metal wire in the case of a mechanical sweeping or scanning (wire-helix contact) on electrolytic paper.

The sweeping or scanning operation determines an elementary line whose width, being in the order of 0.25 mm in general, combined with an adequate paper advancing speed, yields a succession of lines being principally juxtaposed.

A modulation of the beam of light (or of the electric current) causes there to appear— in the course of the scanning of an elementary line — points or a series of points which are juxtaposed in a number comprised between 0 and *q* corresponding to a line of the matrix configuration of the character generator. Each complete character is traced in *p* elementary lines, and at the end of *p* elementary lines, a complete line of characters is printed or otherwise recorded on the paper.

A generator of characters of a known type comprises five columns and seven lines.

In accordance with the present invention, one character appearing in a buffer memory which has a capacity of N characters for one complete line is called, in the course of a scanning or sweeping of elementary lines, according to its order or sequence on the line (position No. 1 at the left end; No. N at the right end) which constitutes its address, and its code is applied to the character generator whose five columns are analyzed successively. This is done N times for the N characters of one elementary line, the operation being repeated seven times for the seven lines of the generator of characters corresponding to seven lines of elementary scanning or sweeping, at the end of which one line of characters has been written by the facsimile apparatus. Then, the facsimile apparatus begins anew a second line of N characters which are present in turn in the buffer memory by means of its first elementary scanning or sweeping line, and so forth.

The apparatus according to the present invention comprises two buffer memories one of which is charged by the codes originating from a telegraphic line, while the other one is in the course of writing, and vice versa, alternating at each line of characters.

Figure 3:
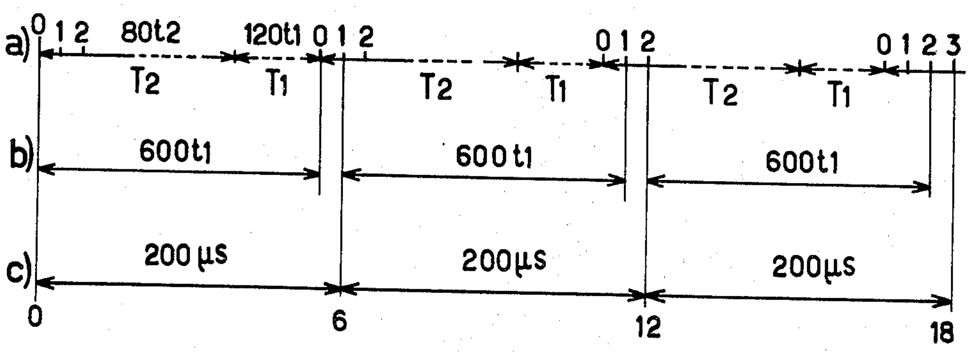
Figure 2A:
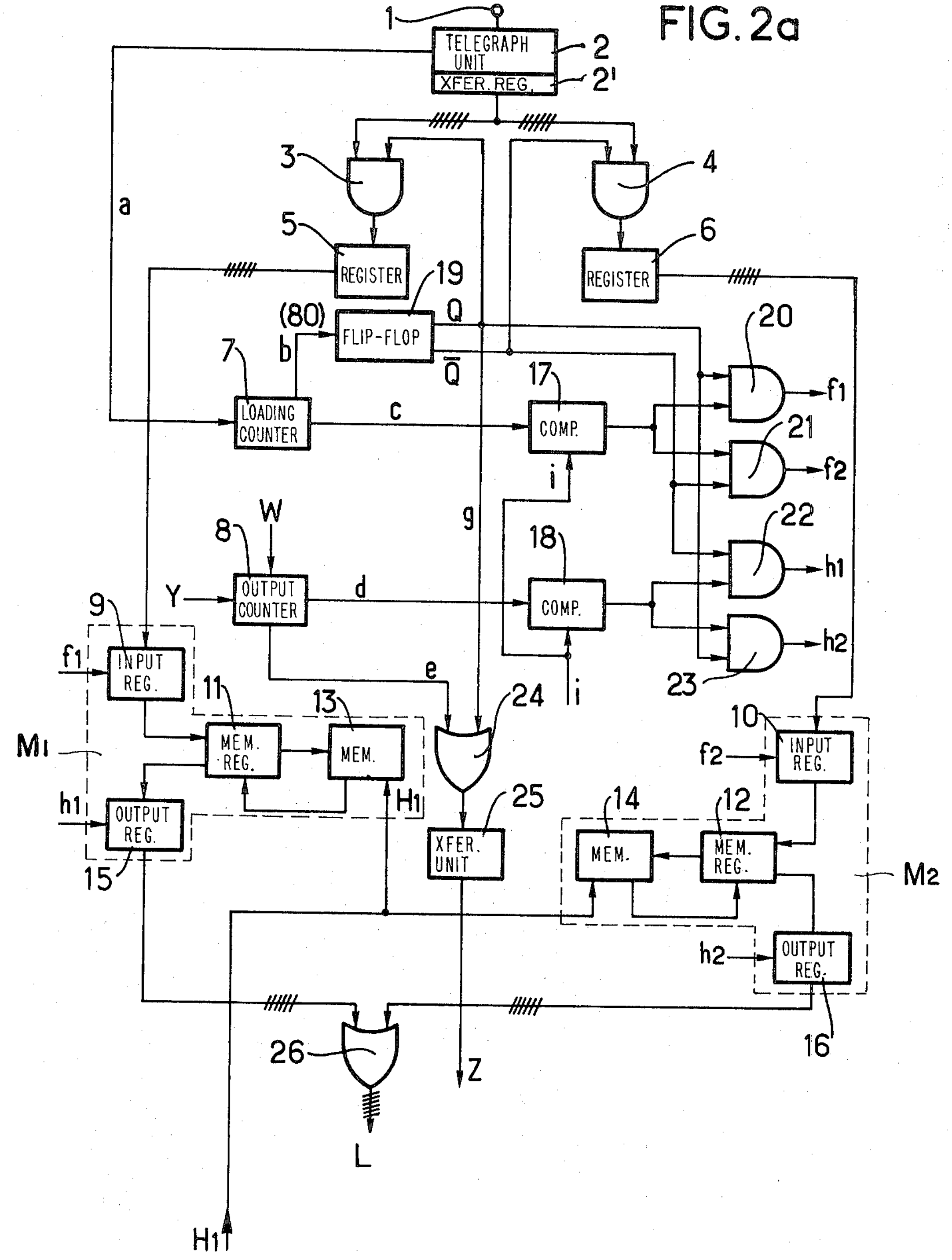
Figure 2B:
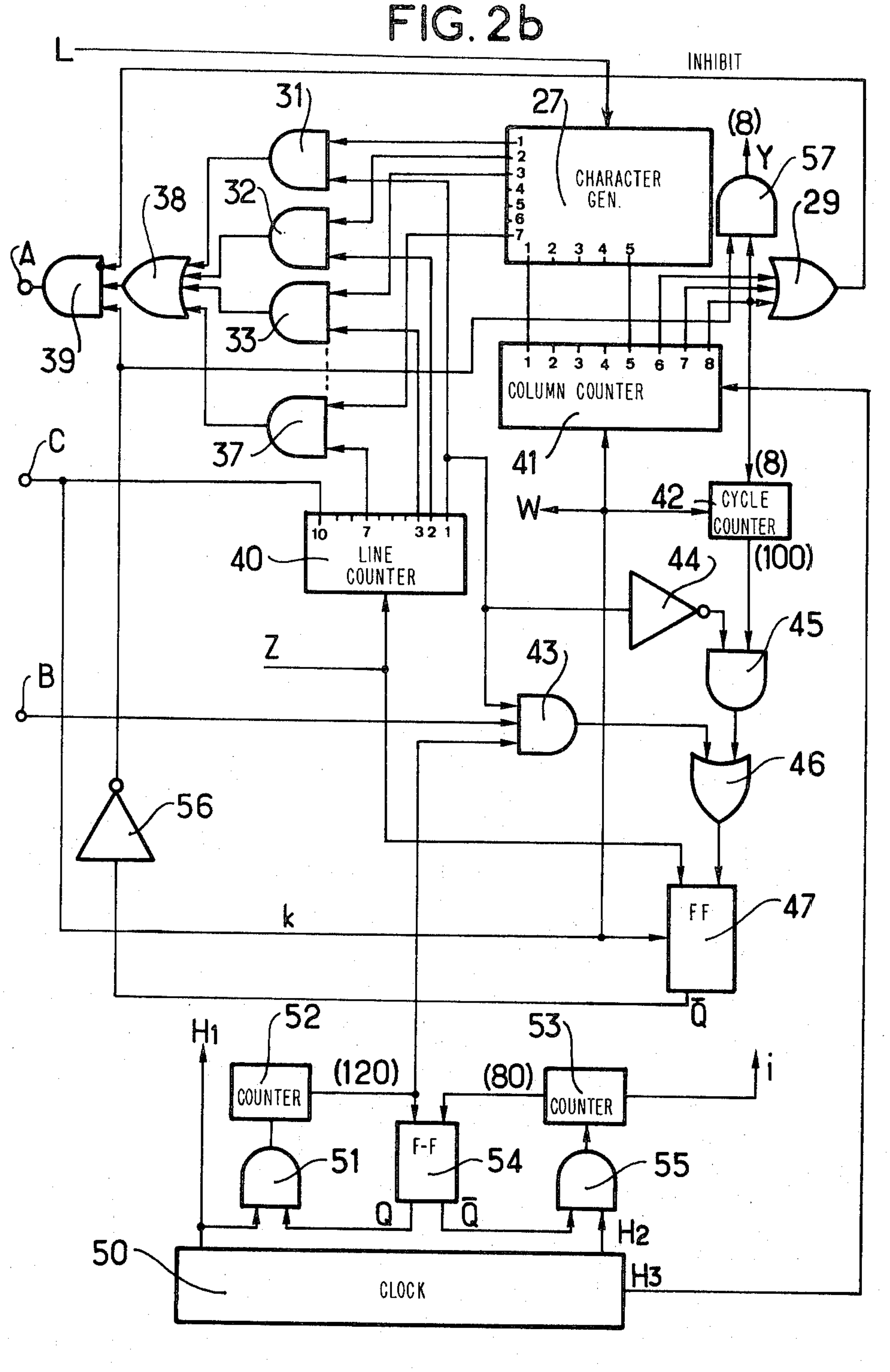

The present invention will now be described in further detail hereinafter with reference to the accompanying drawings, wherein FIG. 1 is a schematic block diagram of a general aggregate or unit in which solely the principal members appear;

FIGS. 2*a* and 2*b* in combination form a more detailed diagram of the system of FIG. 1, and FIG. 3 comprises two graphs showing how the information or data progresses as a function of a measure of time.

In FIG. 1 V is a circuit where a telegraphic line arrives at E. M1 and M2 are two buffer memories having a capacity of N characters. X is a control member which, excited by a line *a*, yields a number increasing by one unit at each character which passes into the circuit V and which controls by means of a line *m* the operation of a switch Y at each passage of a number of characters equal to the capacity of a line. In the case of the figure, the memory M1 is in the course of being charged by the output S of the circuit V, whereas the memory M2 is connected to a character generator G whose output is connected with the modulation terminal A of the facsimile apparatus F. T is a clock which distributes clock signals at different frequencies to the different members of the system and which is started by a pulse originating from the terminal B of the facsimile apparatus F, at the beginning of the line of characters to the end of the left-hand margin of the sheet of paper.

It may be assumed, for example, that, since the telegraphic signals of the start-stop type which arrive at E are accompanied by a parity control, it is this parity control which is applied by the line *a* to the member X.

The memories M1 and M2 exchange their role each time the memory which is in the course of being charged is charged at full capacity.

FIGS. 2*a* and 2*b* in combination schematically represent a logic diagram of one embodiment of the present invention.

For economical reasons, the buffer memories M1 and M2 (FIG. 1) are preferably provided, in the form of circulating memories, constructed with elements of the MOS (metal-oxide, semiconductor) type. These buffer memories constitute the most significant item of the cost of the apparatus, and the economy assured by the use of subassemblies furnished by the semiconductor industry at a relatively low price has therefore a profound effect on the price of the complete apparatus.

As seen in FIG. 2*a*, telegraphic signals from the output of a modern (modulator/demodulator) for example, arrive at terminal 1 of a circuit 2 with which a transfer register 2' is operatively associated. These signals are of the arhythmic type of start-stop series. The circuit 2 assures the series-parallel transformation of the bits of information or data, the elimination of the start and stop signals, and the transcoding, if necessary, of the data into a normalized code with six bits.

By way of an AND gate 3 which opens a first memorization channel (odd channel), the six bits in parallel issuing from the transfer register 2' are received in a first connecting register 5, from where they pass, still in parallel, into a register 9, the first memory input register, which brings about an inverted parallel-series conversion. From the input register 9, the six bits of one character pass into a first memory register 11, and from there into a first memory 13 which is relooped on the memory register 11. The unit of the memory register 11 and the memory 13 constitutes a circulating memory where the information circulates in closed circuit at a frequency of H1, and may be extracted by an output register 15. Such circulating memories with an input register and an output register are known.

A second memorization channel (even channel) which may be opened by a second AND gate 4 comprises a second connecting register 6, a second input register 10, a second memory register 12, a second memory 14, and a second output register 16. The memory 14, being relooped on the memory register 12, constitutes a second circulating memory where the data circulates at the same frequency H1.

In order to make the subject matter clearer without, however, the reducing the generality of the description of the present invention, the number of characters occupying a written line which has been identified above as N will be selected to be 80 by way of example only. The characters do not occupy an entire line. The line comprises also a margin which has been fixed or established at the length occupied by 20 characters. A complete line encompasses therefore a total of 100 character positions, 20 empty positions which represent the margin, and 80 effective characters of 6 bits each. A line scanning or sweeping thus covers 600 time bits *t*1.

Consequently, each circulating memory has a total capacity of 600 bits, or 6 bits in the memory register (11 or 12), and 594 bits in the memory (13 or 14).

A loading counter 7 is provided having a capacity of 80 which advances by one unit at each arrival of one character in the circuit 2 (line *a*).

As soon as the loading counter 7 is at full capacity, an output is provided on conductor *b* which changes the state of a binary flip-flop 19 whose outputs Q, $\overline{Q}$ control the opening-closing of the AND gates 3 and 4.

A first comparator 17 receives by means of a line *c* the states or conditions of the input counter 7 and also the conditions or states *i* of a selection counter 53, which will be further described hereinbelow.

When there is coincidence between the order of sequence *j* of a character posted by the input counter 7 and the number *i* posted by the selection counter 53, an input order for the memories M1 and M2 is emitted by the comparator 17 and applied to the inputs of the two AND gates 20 and 21. Other inputs of these AND gates are connected to the output terminals Q and $\overline{Q}$ of the flip-flop 19, respectively. For one state or condition of the flip-flop 19, $Q=1$, $\overline{Q}=0$, the AND gate 20 then transmits an opening order or command *f*1 to the input register 9. For the inverse state or condition of the flip-flop 19, $Q = 0$, $\overline{Q} = 1$, the AND gate 21 transmits an opening order or command *f*2 to the input register 10.

A second counter 8, an output or writing counter, having a capacity of 80, receives an advance order by means of a line Y each time a character segment is written (see below). It is reset to 0 by means of a control W (see FIG. 2*b*).

A second comparator 18 receives by way of a line *d* the states or conditions of the output counter 8 and moreover the states or conditions *i* of the selection counter. When there is coincidence between the order or sequence *j'* of a character posted by the output counter 8 and the number *i*, and output memory order or command is emitted by the comparator 18 and applied to inputs of the two AND gates 22 and 23. The terminal Q of the flip-flop 19 connected to an input of the gate 20 is also connected to an input of the gate 23; the terminal $\overline{Q}$ being connected to an input of the gate 21 is also connected to an input of the gate 22. For one position of the flip-flop 19, the gate 22 sends a character output order *h*1 to the output register 15, and for the other position, the gate 23 sends a character output order or command *h*1 to the output register 16.

It is evident that, under these conditions, a circulating memory is charged with incoming characters while the other circulating memory, having been previously charged, transfers its content to the writing system, and vice versa.

An OR circuit 24 receives by means of a line *e* a "full capacity" signal from the output counter 8, and by means of a line *g* a flip-flop signal from the flip-flop 19. A branching circuit 25 connected to the output of OR circuit 24 furnishes a signal Z whose use will be further described hereinbelow.

The characters originating either from the output register 15 or from the output register 16 in the form of six bits in parallel are applied by an OR circuit 26 as a signal L to a character generator 27 (FIG. 2*b*).

As seen in FIG. 2*b*, the character generator 27 has five interrogating inputs per column numbered 1 to 5, and seven output lines, numbered 1 to 7.

A character of seven lines and five points each is separated from an adjacent character by a width of three spaces of the column. A writing line is separated from the next-following line by an interline having a height of three line thicknesses. This is the reason why the column counter 41 has eight outputs, five outputs (1 to 5) being connected to the character generator 27, plus three additional outputs (6 to 8); and, the line counter 40 has ten outputs, seven affecting the seven line outputs of the character generator 27 (1 to 7), plus three additional outputs (8 to 10).

At each scanning or sweeping of an elementary line, the tracing orders or commands are communicated to the terminal A of the facsimile device by means of one AND gate of seven line gates (31 to 37), of an OR circuit 38, and an AND gate 39.

On the first sweeping or scanning line, each segment of the character whose code is applied to the input of the character generator 27 is traced at the place or position corresponding to its order or sequence according to the intersection of the five columns of the character generator with the first line, through the gate 31 opened by the output 1 of the line counter, and so forth up to the seventh line where the seventh segment of the same character is traced at the same abscissa according to the intersection of the five columns of the character through the gate 37 opened by the output 7 of the line counter. On the outputs 6, 7, and 8 of the column counter corresponding to the three times of the clock signal H3, the OR circuit 29 transmits to an inhibiting input of the AND gate 39 a tracing interdiction. This is the interval between two characters.

The paper is displaced at a continuous speed in such a manner as to advance about 1/7 of the height of one character or type during one elementary line scanning. When a line of characters has been traced at the end of seven elementary lines of scanning, the paper advances still by three empty elementary lines constituting the interline before starting again with the first elementary line of the next-following line of characters or types.

When the line counter arrives at the end of the tenth elementary line (No. 10) the output 10 of the line counter, acting upon the terminal C of the facsimile device which is a command for disengaging or releasing the paper, stops the advance movement of the paper.

At the first switching of the flip-flop 19 indicating that data is entered in memory (11, 13) representing 80 characters forming a complete line of writing, a signal Z resets the line counter 40 to 1; the releasing command is blocked, and the paper resumes its advancing movement.

A cycle counter 42 having a capacity of 100 advances by one unit at each passage of the column counter 41 by the value 8. It is this signal marked Y which is applied to the input of the counter 8.

The frequencies are as follows in the embodiment taken as an example for the present description.

The time clock 50 comprises a base oscillator H having the frequency 12, 120 MHz, and furnishes three clock signals; namely, the clock signal H1 having the frequency $H/4 = 3.3$ MHz, this is the clock signal of the "bits time"; the clock signal $H2 = H1/6 = H2/24 = 505$ kHz, this is the clock signal of the "character time" or selection clock ($i$); and the clock signal $H3 = 40$ kHz, this is the clock signal of the "column time." The clock signal H3 controls the advance of the column counter 41.

The selection counter 53, having the capacity 80, counts the selection orders or sequences $i$. When it has arrived at its full capacity, the scanning of the elementary line is not finished; the frequency of the electronic system continues by a filling counter 52 having the capacity of 120 which receives the clock signals H1. By means of the set of AND gates 51 and 55 and the bistable flip-flop 54, the counter 52 begins to count the times H1 when the counter 53 arrives at 80, and the counter 53 begins anew to count the times H2 when the counter 52 arrives at 120.

The stopped position of the line counter 40 is 10. The first signal Z which arrives on the counter 40 sets it to 1 and the others make it progress from 1 to 10.

On the first elementary line, the beginning is assured by the coincidence of three signals arriving at AND gate 43. A large square wave is furnished by the facsimile apparatus on the terminal B, upon reaching the end of the margin on the left of the paper, — the condition 1 of the counter of lines, — the condition 120 of the charging counter 52. The output of gate 43 passing through an OR circuit 46 sets a bistable flip-flop 47 to 1 which then authorizes the passage of the clock H3 through the output Q thereof on the column counter 41. On the other elementary lines, the beginning is assured by the passage to 100 of the cycle counter 42 whose full capacity signal is transmitted to the OR circuit 46 by an AND gate 45, which receives by means of an inverter 44 the reverse of the line output signal 1 of the line counter.

The flip-flop 47 is reset to $\overline{Q} = 1$ by the signal Z. The signal "line 10" which stops the movement of the paper (terminal C) brings about the resetting of the flip-flop 47 to 0 by a connection $k$. The same signal assures the resetting to 0 of the "columns" counter (41), of the counter to 100 (42), and of the output counter (8) by the command W (general start).

The "column" counter 41 operates for the entire duration of the elementary lettering or recording line because of the fact that it controls the advance to 100 of the cycle counter 42.

The condition 80 of the writing counter 8 assures by means of the line Z a. the advance of the line counter (40), and b. the positioning at $\overline{Q} = 1$ of the flip-flop (47).

This condition of the flip-flop has the effect of a. blocking the gate (39) through the inverter (56) so as to avoid any inopportune lettering or recording in the margin, and b. blocking the advance proper of the writing counter (8) by the AND gate (57).

OPERATION

When the first character comes before the circuit 1, it is transferred into an input register, for example the register 9. At the same time, the loading counter is set to value 1. This character is introduced into the circulating memory M1 of the odd channel (11–13) in the form of six bits in series when the selection counter 53 indicates $i = 1$, which releases a signal $f1$ to open input register 9.

When the second character arrives, the counter 7 posts the value 2, the second character is transferred into the circulating memory when the selection counter 53 marks or indicates the value 2; the 6 bits of the second character are placed in the circulating memory following the bits of the first character, and so forth, until the input counter 7 indicates 80. At that moment the charge of a complete line of characters is terminated, the binary flip-flop 19 is reversed, by an output on line 6 from counter 7 the odd channel becomes the recording channel, and it is the even channel which is charged by the following 80 characters.

The recording of the 80 characters of a line is made in a rhythmic fashion in accordance with the frequencies of the facsimile apparatus to which the electronic system is adapted.

On an elementary line one tracing of a character segment which occupies eight columns with the space between characters lasts 200 microseconds. Thus, the column time is 25 $s$, therewith the frequency of the clock $H3 = 40$ kHz.

An elementary line occupies the duration of 100 characters, or 20 milliseconds (rotation of the drum of the facsimile device 3,000 rev/min at the frequency of the sector). A line of characters occupies the duration of 10 elementary lines, including the interline, or 200 ms. The apparatus thus traces five lines of characters per second, of 80 characters each, or 400 characters per second. For a maximal rapidity of 500 characters per second (without margin) with a code at 6 + 2 moments, the corresponding telegraphic speed is 4,000 bauds.

The signal Y which controls the advance of the output counter 8 has a repetition frequency of 5 kHz.

Each character of a line is signaled at the input of the character generator (signal $h1$ or $h2$) at each passage of the column counter 41 by 8 (signal Y).

Each circulating memory has a capacity of 600 bits, subdivided into 6 bits in the memory register (11 or 12), and 594 bits in the memory (13 or 14). This capacity corresponds to a full line of characters (80 characters of 6 bits, or 480 bits) plus a marginal spacing of a width of 20 characters, or 120 bits, which are all zeros.

If the circulating memory executed an exact turn in 200 *s* (step - character), one would always call on the same character at each step character. In order to progress by one character at each step character, one causes the memory to turn by 606 step-bits during one step character, or one cadence of 3.03 MHz $= H1$. The selection counter 53 advances at one cadence six times more slowly, or 505 kHz $= H2$.

In this manner, the character generator 27 decodes every 200 *s* one character whose sequence or order has increased by one unit.

The telegraphic speed and the recording speed (one line of characters in 200 milliseconds) must be harmonized in such a manner that the charging of one input memory lasts a little longer than the writing of one line of characters. Under these conditions, after the writing of one line of characters, the recording stops for a short moment (position 10 of the line counter) and resumes from there when the input memory is full, which leads the line counter to the position 1 by means of the switching of the flip-flop 19.

FIG. 3 comprises two graphs (a) and (b), and a time scale (c). Graphs (a) and (b) show how the circulating memories on the one hand and the selection counter on the other hand advance by one step-character every 200 *s*. Time $t_1$ is the bit time and time $t_2$ is the character time. One obtains $T_1 = 120\ t_1$ and $T_2 = 80\ t_2$.

It is understood that all of the numerical values have been given solely by way of example.

What is claimed is:

1. A device for the use of a facsimile apparatus as a printing mechanism for alphanumeric characters, adapted to write N characters per line, comprising telegraphic means for providing code signals representing alphanumeric characters, a character generator which furnishes order signals to said facsimile apparatus in response to code signals applied in parallel to the input thereof, first and second identical buffer memories having a capacity at least equal to N characters, charge control means connected to said telegraphic means for successively applying the code signals of each group of N characters alternately to said first and second buffer memories, and reading means for successively applying the code signals of N characters stored in the one of said first and second buffer memories which is not receiving code signals from said telegraphic means to the input of said character generator, said charge control means including loading control means for aligning side by side in each buffer memory the codes of N characters forming one line of characters, said reading means including means for successively applying said codes of N characters from said buffer memories to the input of the character generator in the course of one scanning of the elementary line and means for repeating the reading operation in memory on *p* scanning lines corresponding to *p* lines of the character generator.

2. A device according to claim 1, wherein each of said buffer memories is a circulating memory having a capacity corresponding to the code being used and to the total length of a line of the facsimile apparatus.

3. A device according to claim 2, wherein the code being used includes six bits defining each character and the total length of a line of the facsimile apparatus is N characters plus a predetermined number of spaces for margin making a total capacity of N', each buffer memory including a memory register having a capacity of six bits looped with a memory having a capacity of six times $(N' - 1)$ bits, the circulation of the data in each buffer memory being at a first frequency such that the duration of one character on an elementary scanning line covers the re-circulation time of the buffer memory.

4. A device according to claim 3, wherein said loading control means includes a loading counter having the capacity N, said telegraphic means advancing said loading counter by one unit for each character received, an output counter having a capacity N, means for advancing said output counter by one unit for each elementary line segment covering one character, a selection counter, means for advancing said selection counter at a cadence six times more slowly than the cadence of the circulation of the information in said first and second buffer memories, said selection counter having the capacity N receiving data from a charging counter operating at said first frequency and having the capacity $6{\cdot}(N' - N)$.

5. A device according to claim 4, further including a first comparator connected to the output of said first loading counter and to the output of said selection counter, which furnishes an output signal at the coincidence between the conditions being compared, and a second comparator connected to the output of said output counter and to the output of said selection counter, which furnishes an output signal at the coincidence between the conditions being compared.

6. A device according to claim 5, further including a binary flip-flop receiving from said loading counter a switching signal each time said loading counter reaches full capacity, first logic means responsive to said flip-flop for causing the bits of the incident characters to be entered into one of said first and second buffer memories, and second logic means for applying the bits of the characters in the circulating memory of the other buffer memory to the character generator, said first and second logic means being connected to receive the output signals of said comparators.

7. A device according to claim 6, further including a line counter having a plurality of outputs, a plurality of AND gates and a column counter, said character generator having *q* input columns which are sampled by the output conditions of said column counter, and *p* output lines which are connected through respective ones of said AND gates, each having one control input connected to one respective output of said line counter.

8. A device according to claim 7, further including a cycle counter, said column counter receiving a clock signal either due to the command of an initialization signal generated by the facsimile apparatus for the first position of the line counter, or due to the command of a full capacity signal of said cycle counter having the capacity N'.

9. A device according to claim 8, wherein said line counter is connected to be reset to the first position by the switching of said flip-flop, and advances by one unit at each passage of said output counter to its full capacity.

10. A device for printing lines of alphanumerical characters including N characters in successive elementary lines each bearing segments corresponding to N characters in a facsimile type printer having a defined character segment recording frequency in an elementary line comprising:

a first circulating buffer memory having a capacity for storing the series bits of N coded characters forming a single line of a recording to be formed, a character generator supplying recording order signals to the printer in response to each coded character which it receives from said first buffer memory to ensure the recording of each character in the form of segments disposed on $q$ elementary lines and each comprising $p$ columns, output coupling means connecting said first buffer memory with said character generator, time base generator means supplying first impulses for controlling the circulation of series bits in said first buffer memory and having a frequency related to the recording frequency of the character segments so that between the beginning of plotting two consecutive coded characters $(N+1)$, N characters appear successively at the output of the first buffer memory, and supplying second impulses having a frequency equal to the circulation frequency of the coded characters in the first buffer memory, selection counter means controlled by said second impulses and having a capacity N for ensuring synchronism between the row of characters to be recorded and its code in said first buffer memory, output counter means for counting the rows of characters recorded per elementary line, and first comparator means detecting the coincidence between the row designated by said output counter and the value of said selection counter for controlling said output coupling means.

11. A device as defined in claim 10 comprising a second circulating buffer memory having a capacity equal to said first buffer memory, the circulation of the series stages thereof being controlled by said first impulses from said time base generator means, a loading counter having a capacity N and being advanced in response to receipt of each coded character, and second comparator means detecting the coicidence between the output values of said input counter and said selection counter for controlling the application of said coded characters into said first and said second buffer memories.

12. A device as defined in claim 11, further comprising a first flip-flop which is switched by said loading counter on its passage through its full capacity N, first logic index means controlled by said first flip-flop to alternate the charging operations of said first and second buffer memories on receiving said coincidence signals from the second comparator means, and second logic index means controlled by said first flip-flop to alternate the reading operation of said first and second memories upon receiving coincidence signals from said first comparator means.

13. A device as defined in claim 12, furthur comprising a cycle counter having the capacity N', $N'-N$ corresponding to the number of character spaces defining a margin in a line of recording controlled by the impulses at the recording frequency of the characters, a second bistable flip-flop which is reset on each passage of the output counter means through full capacity and is set on each passage of said cycle counter through its full capacity, said second flip-flop receiving a start signal from the facsimile printer at the beginning of each line of recording, and an AND logic gate controlled by said output signal of said second bistable flip-flop receiving the pulses at the recording frequency of the character segments to control the advance of said output counter means thereby ensuring counting of the character segments per elementary line.

* * * * *